June 2, 1953 — W. C. HALE, JR — 2,640,618
BLIND RIVETED JOINT
Filed Jan. 13, 1950
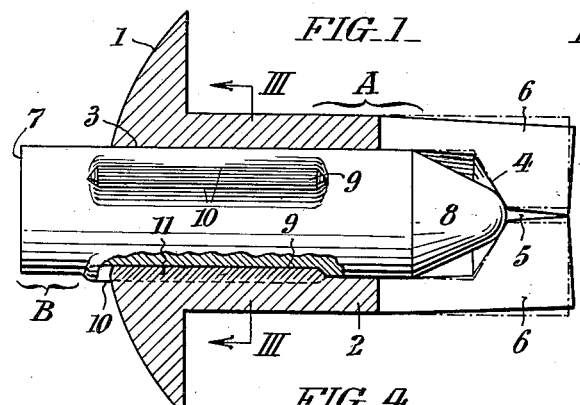
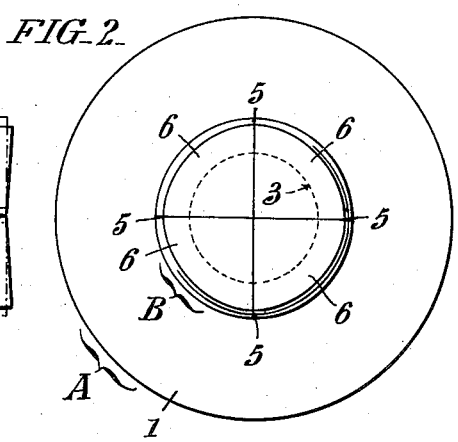
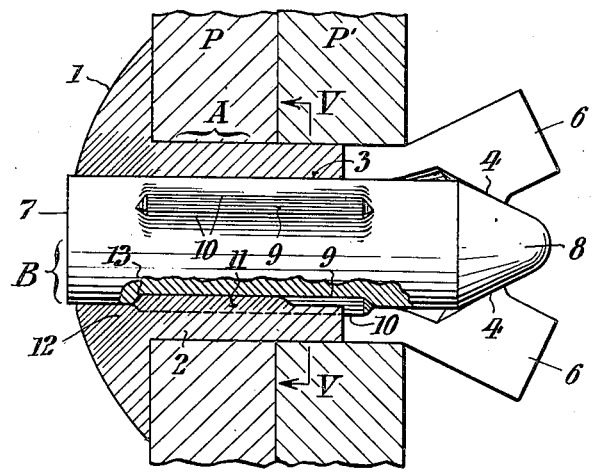
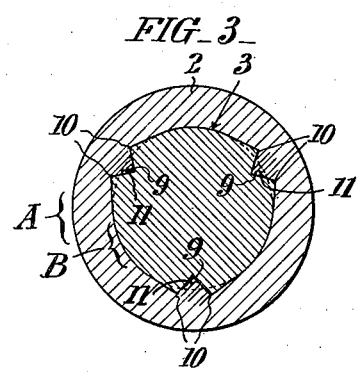
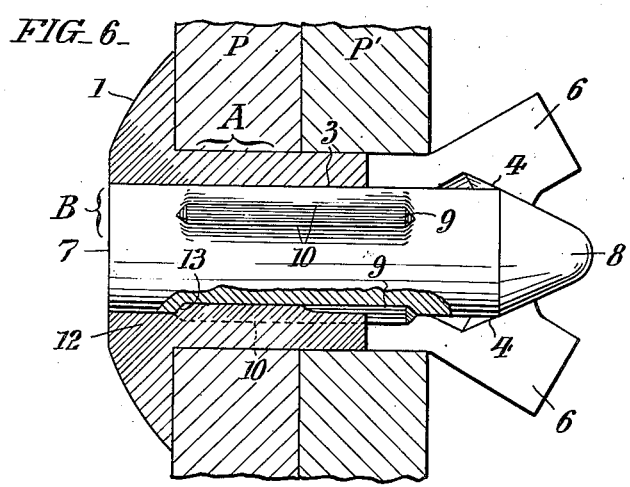
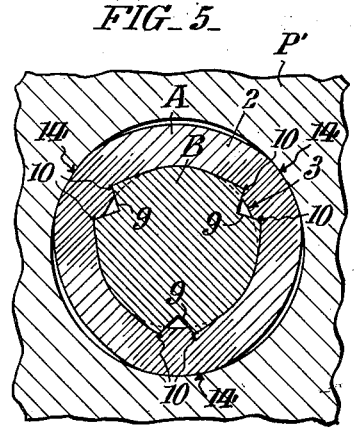
INVENTOR:
*William C. Hale, Jr.,*
BY *Paul & Paul*
ATTORNEYS.

Patented June 2, 1953

2,640,618

UNITED STATES PATENT OFFICE 2,640,618

BLIND RIVETED JOINT

William C. Hale, Jr., Chester, Pa., assignor to South Chester Corporation, Chester, Pa., a corporation of Delaware Application January 13, 1950, Serial No. 138,332

2 Claims. (Cl. 218—29)

This invention relates to fastening devices intended for use in permanently securing together structural elements such for example as overlapped plates or sheets. More particularly the invention is concerned with two element securing devices of the general type disclosed in U. S. Patent No. 1,643,771 granted to J. W. Iseman on September 27, 1927, wherein an expander pin is driven into an axially socketed headed component having a shank, to spread the prongs at the distal slitted end portion of a shank. In such devices as ordinarily fabricated, the expander pins are plain-surfaced and hence prone to slip out of place after a time, with the result that the headed components become loose by wear due to vibration and therefore fail to maintain the connected elements in rigidly secured relation. Moreover, with these prior art securing devices, pre-assembling of the component elements at the factory does not insure retainment of the pins by the headed components, and consequently they must be re-assembled by the user in the field, which is annoying and time consuming especially when the parts are small and not readily handled.

My invention has for its chief aim to overcome the above mentioned drawbacks which objective is realized in practice, as hereinafter more fully disclosed, through provision of a fastening device of the type referred to, wherein the expander pin is so constructed as to be self retaining after being initially assembled with the headed component at the factory for the market, and which in being driven home incident to application of the device, will cause the shank of said component to be circumferentially expanded into pressure engagement with the walls of registering apertures in the parts being connected, and the prongs to be concurrently spread to rigidly unite said elements, with the parts of the device so incorporated as to be immune against loosening or yielding to wear under vibration.

Other objects and attendant advantages of my invention will appear from the following detailed description of the attached drawings, wherein Fig. 1 is a view partly in elevation and partly in axial section, of a fastening device conveniently embodying my invention, with its components pre-assembled and ready for use.

Fig. 2 shows the elevation of the rear end of the assemblage.

Fig. 3 is a cross section taken as indicated by the angled arrows III—III in Fig. 1.

Fig. 4 is a fragmentary view in section showing how the device is intended to be used, with the expander component part way advanced in the main component.

Fig. 5 is a section taken as indicated by the angled arrows V—V in Fig. 4; and

Fig. 6 is a view corresponding to Fig. 4, showing the expanding element in its final position in the rivet component.

With more detailed reference to these illustrations, the letter A comprehensively designates the main component which in practice is fashioned from relatively soft metal such as copper or aluminum, and B, the expander component which is fashioned from hard metal such as steel, these components being pre-assembled for marketing in the relation shown in Fig. 1. As exemplified, the component A has a rounded head 1, a cylindric shank 2, and a cylindric axial socket bore 3 whereof the bottom 4 is conically recessed at a relatively wide angle and terminates short of the distal end of said shank. It will be further noted that the end portion of the shank 2 is longitudinally slitted at right angles through its axis as at 5, to set apart outwardly expandable prongs 6 for a purpose later on explained.

The expander component B is in the form of a pin whereof the diameter corresponds to that of the bore 3 in the headed component A, the outer end of the pin being square cut as at 7, and the inner end 8 being round pointed and tapered at a sharp angle as compared with that of the recessed bottom 4 of the socket bore of the component A. V section grooves 9 (in this instance, three) are formed longitudinally in the pin B at circumferentially-spaced intervals in such a way as to provide relatively sharp paralleled lengthwise ridges 10 to extend somewhat beyond the cylindric surface of said shank as shown in Fig. 3. It is to be especially observed that the slots 9 and the ridges 10 terminate well short of the ends of the cylindric portion of the pin B. In practice, the component A is made from a relatively soft metal and the component B from a metal much harder by comparison for a reason which will be presently understood.

To assemble the parts for marketing in readiness for use, the split end of the shank 2 of the component A is clinched to collapse the prongs as shown in Fig. 1, and the pin B is forced into the bore 3 of said component until the rounded tip of its tapered end 8 just about contacts the bottom 4 of said bore. In carrying out the latter step, the shank 2 of component A is held to its true cylindric form by a suitable constraining means (not illustrated) so that the amount of the soft metal of the shank displaced by the action of the ridges 10 on the pin B is forced into the troughs of the V grooves 9, as at 11 in Figs. 1 and 3. Subsequent disassociation of the two components when so assembled cannot therefore occur either before or during application of the device in practice.

When the device is used, for example, to secure together two overlapped plates or the like P, P' as in Figs. 4 and 5, the shank 2 of the headed component A is passed through registering apertures of slightly larger diameter in said plates (this operation being facilitated by the slight taper of the shank effected by collapsing of the prongs 6 at its split end) until the back of the head 2 bears against the outer plate P. With this accomplished, the protruding end of the expander pin B is struck one or more blows, as may be necessary, with a hammer or other suitable tool, until fully driven into the component A. As the pin B advances, in Fig. 4, a portion of the metal of the component A, previously forced into the grooves 9 during assembling as above explained, is displaced outwardly at the regions 12 by the outer end shoulders 13 of said grooves, while, by the action of the ridges 10, the shank 2 is circumferentially expanded into pressure engagement with the walls of the apertures in the plates P, P' as exaggeratedly shown at the regions 14 in Fig. 5. At the same time, the split end of the shank 2 is expanded through camming action between the rounded sharply tapered end 8 of the pin B and the coned bottom of bore 3 in the rivet component A and the prongs 6 thereby bent outwardly behind the plate P'. When the pin B is driven home with its square end flush with the outer face of the head 1 as in Fig. 6, the plates P, P' will be rigidly clamped together between said head and the outwardly spread prongs 6, and the pin will be effectively secured against rotation within the shank as well as against dislodgment endwise due to displacement of the metal of the shank into the grooves 9 at 11. Moreover, by reason of the dilation of the shank into pressure engagement with the inner surfaces of the apertures in the plates P, P' at the regions 13, the component A will, in turn, be fixedly held against rotation in said plates.

Certain proportional relations are essential for attainment of maximum efficiency of the device in actual use. For best results, the dimension from the square end 7 of the pin B to the front ends of the grooves 9 should not be in excess of half the diameter of the pin, but should be at least 25% of the diameter of the pin. The depth of the bore 3 in the component A should be somewhat in excess of the combined thickness of the plates or elements P, P' which are to be connected. The length of the pin B should not appreciably exceed the length of the rivet component A in order to avoid undue projection of its tapered end 8 beyond the prongs 6 when the latter are fully spread as in Fig. 6. It is to be understood that the length of the grooves 9 (and of the ridges 10) of the pin B are varied in accordance with the metal from which the rivet component A is made. Thus if the metal of the component A is relatively soft and hence easily displaced, the length of the grooves 9 may be equal approximately to the length of the shank 2 from the inner surface of the head to the point at which the prongs 6 commence to spread as shown in Fig. 6. When harder metals, more resistant to easy displacement, are used for the headed component A, the grooves 9 in the pin B must be made shorter so that less metal is displaced and breaking down of the ridges 10 avoided during driving of the pin as the device is applied.

Having thus described my invention, I claim:

1. In combination an expanding rivet consisting of a head, a shank with a longitudinally split end portion and an axial cylindrical socket bore terminating short of the distal end of the shank; and an expander pin of substantially the same diameter as the bore consisting of a cylindrical portion and a tapered end portion, said expander pin being of a harder material than said shank and having substantially three relatively narrow, longitudinal, circumferentially spaced V-grooves and associated ridges formed therein in the central longitudinal portion of the cylindrical portion thereof whereby integral ridges are formed adjacent each groove on either side thereof, said pin terminating at a distance from said grooves and ridges substantially equal to the thickness of said head whereby said shank is circumferentially expanded at spaced intervals in the region intermediate the head and split end portion when the pin is driven to a position wherein the end of the pin is flush with the head.

2. In combination an expanding rivet consisting of a head, a shank with a longitudinally split end portion and an axial cylindrical socket bore terminating short of the distal end of the shank; and an expander pin of substantially the same diameter as the bore consisting of a cylindrical portion and a tapered end portion, said expander pin being of a harder material than said shank and having substantially three relatively narrow, longitudinal, circumferentially spaced V-grooves and associated ridges formed therein in the central longitudinal portion of the cylindrical portion thereof whereby integral ridges are formed adjacent each groove on either side thereof, said pin terminating at a distance from said grooves and ridges substantially equal to the thickness of said head, the unslitted portion of the shank being circumferentially expanded in the region corresponding to said grooves and ridges and said split end portion being expanded along the tapered portion and ungrooved distal portion of said pin, and a plurality of plates or the like bound between the head and the expanded split end of said shank.

WILLIAM C. HALE, JR.

References Cited in the file of this patent

UNITED STATES PATENTS

| Number | Name | Date |
|---|---|---|
| 928,947 | Dawson | July 27, 1909 |
| 2,057,648 | Kiefner | Oct. 13, 1936 |
| 2,135,322 | Brantingson | Nov. 1, 1938 |
| 2,181,103 | Davis | Nov. 21, 1939 |
| 2,264,747 | Fether | Dec. 2, 1941 |
| 2,301,244 | Bishop | Nov. 10, 1942 |
| 2,344,717 | Mills | Mar. 21, 1944 |
| 2,358,578 | Keehn | Sept. 19, 1944 |
| 2,389,479 | Austin | Nov. 20, 1945 |

FOREIGN PATENTS

| Number | Country | Date |
|---|---|---|
| 563,295 | Great Britain | Aug. 8, 1944 |